UNITED STATES PATENT OFFICE.

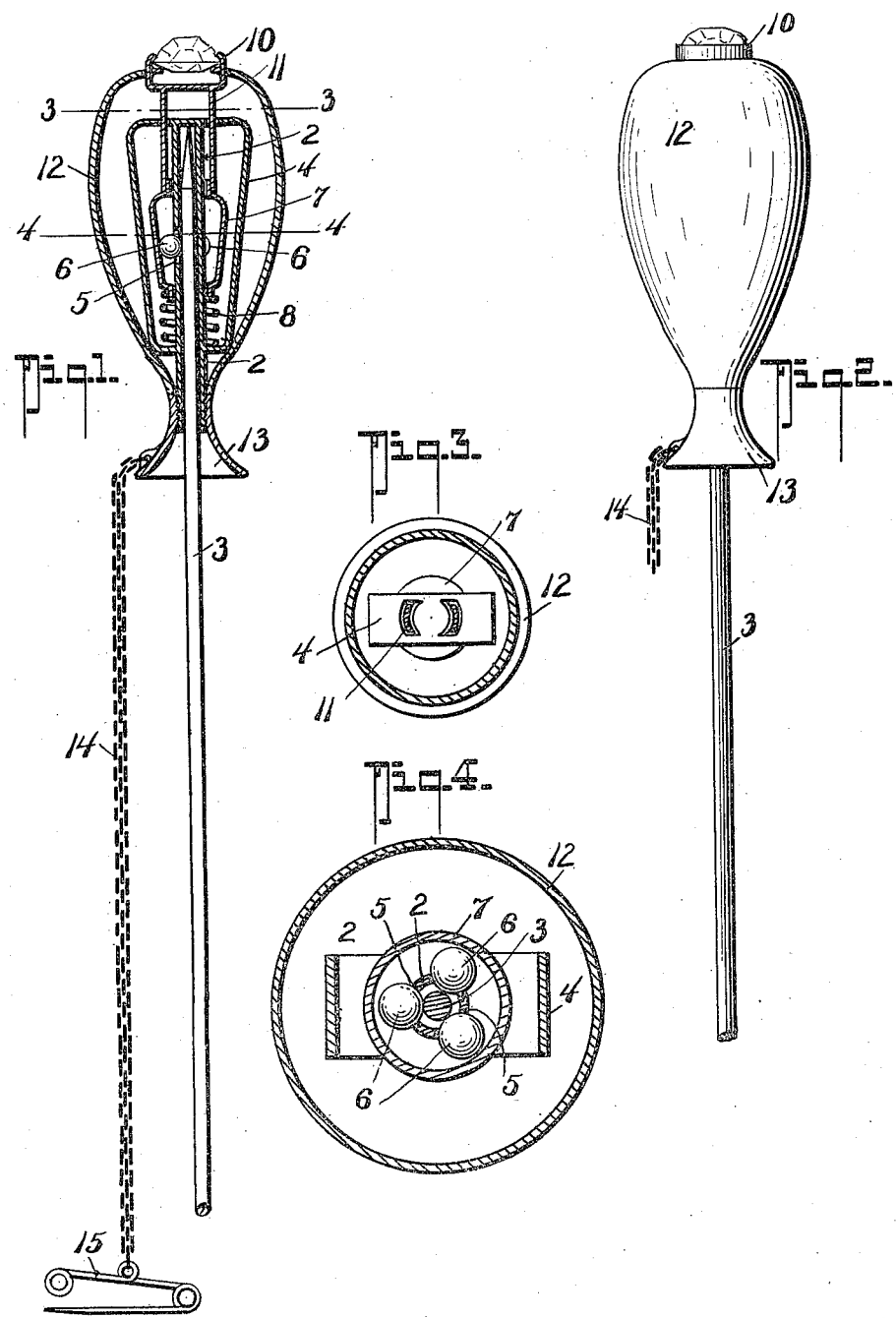

WILLIAM NEPEAU HUTCHISON AND JAMES ARCHIBALD ANDREW, OF VICTORIA, BRITISH COLUMBIA, CANADA.

HAT-PIN GUARD.

975,620.

Specification of Letters Patent.　Patented Nov. 15, 1910.

Application filed April 1, 1910.　Serial No. 552,928.

*To all whom it may concern:*

Be it known that we, WILLIAM NEPEAU HUTCHISON and JAMES ARCHIBALD ANDREW, citizens of the Dominion of Canada, residing at Victoria, in the Province of British Columbia, Canada, have invented a new and useful Hat-Pin Guard, of which the following is a specification.

This invention relates to a guard or protector for the point of a lady's hatpin, which at the same time will prevent the accidental removal of the pin from the hat, and my object has been to provide such a guard having a securing means that can be readily placed upon the pin, that will resist accidental or even forcible removal, and that can be easily removed when required and that is withal susceptible of ornamental treatment suitable to the device.

The invention is particularly described in the following specification, reference being made to the drawings by which it is accompanied, in which:

Figure 1 is a longitudinal section through the clutching and releasing device to an enlarged scale, Fig. 2, a similar view showing the external casing thereon, Fig. 3, a cross section on the line A A in Fig. 2 and Fig. 4 shows an enlarged section on the line 4—4 of Fig. 1.

The invention comprises two main parts the securing and releasing device, and an external casing inclosing the mechanism and providing an entering flare or funnel to facilitate entrance of the pin into the securing means.

The clutching device comprises a small tube 2 the internal dimension of which is adapted to loosely fit upon the point of a hatpin 3. One end of this tube 2 is closed by the end of a light open frame 4 secured to it, which frame passes down each side to a short distance from the other end of the tube where it is also secured. Toward the closed end of the tube 2 are three small apertures 5, the size of which will permit small steel balls 6 placed in them to project within the inner dimension of the tube but will not permit the balls to pass through. These apertures 5 should be slightly elongated lengthwise of the tube. The balls are retained in position by a small internally conical sleeve 7 slidable on the tube 2, the smaller dimension of the cone being toward the open end of the tube and such as will hold the balls tightly in the apertures and therefore with their inner sides projected within the tube, while the larger dimension of the cone will permit the balls to fall back clear of the inner dimension of the tube while it will not allow them to fall out of their apertures. This sleeve 7 is held toward the closed end of the tube and with its smaller end in engagement with the balls, by a spring 8 between the smaller end of the sleeve and the adjacent end of the open frame 4 where it is secured on the tube. This constitutes the clutch or securing means, for if a pin is inserted in the tube the balls will be pushed back, and the bearing on the incline of the cone will move it against the resistance of the spring 8 bringing the larger dimension of the cone opposite to the balls 6. This movement is assisted by the direction in which the balls will roll as the pin is inserted.

If an attempt is made to withdraw the pin the balls will roll slightly toward the smaller dimension of the cone and will be forced inward on the pin 3 within the tube 2, and will effectually secure the pin therein, as the stronger the pull on the pin the tighter will the balls be pressed inward on it.

To release the ball clutch from engagement with the pin the sleeve 7 must be pressed against the resistance of the spring 8 to bring the larger dimension of the cone opposite to the balls. This is effected by a push button 10 connected to the larger end of the conical sleeve by members 11 slidable through apertures in the end of the open frame 4.

The mechanism of the clutching device is inclosed to protect it from dust and to provide a basis for ornamentation, by an elongated ovoid casing 12. This casing 12 is passed over that portion of the open end of the tube which projects beyond the open frame 4, and the larger end of the casing is provided with an aperture through which the push button 10 is allowed to project. The casing is secured in position by a flared mouthpiece 13 threaded upon the projecting end of the tube 2 and designed to facilitate entrance upon the point of a hat pin.

The casing 12 is susceptible of ornamentation which may be varied according to the grade or quality of the article or the material from which it is made.

To the mouthpiece 13 of the guard is connected a light chain 14 having a small safety pin 15 by which the device may be secured to the hat.

Having now particularly described our invention and the manner of its use, we hereby declare that what we claim as new and desire to be protected in by Letters Patent, is:

1. As a hatpin guard, the combination with a cone operated ball clutch, a casing inclosing said clutch said casing having a flared inlet for the insertion of the pin and a push button projecting through the other end of the casing for releasing the clutch.

2. As a hatpin guard, the combination with a tube loosely fitting on the point of the pin, small balls inwardly projecting through apertures in the tube and into engagement with a pin inserted in it, a hollow cone slidable on the tube outside of the balls the smaller end of which cone is toward the end of the tube through which the pin is inserted, an open frame secured to and closing one end of the tube and extending on each side outside of the cone toward the open end of the tube to which it is secured, a spring between the smaller end of the cone and the adjacent end of the open frame, a push button beyond the closed end of the tube having members slidable through the adjacent end of the open frame and secured to the larger end of the cone, a casing inclosing the mechanism of the tube said casing having at one end an aperture through which the push button projects and at the other end a flared inlet to the tube, and means for removably securing the guard to a hat or other convenient part of the attire.

3. As a hat pin guard, the combination with a tube loosely fitting on the point of the pin, a hollow cone slidable on said tube, balls in said hollow cone, said tube having slots through which said balls project to grip a pin, a frame supported by said tube and embracing said cone, said frame having slots, bars projecting through said slots and secured to said cone, a push button carried by said bars in virtue of which said cone may be moved along said tube in one direction, a spring on said tube for moving said cone in an opposite direction to cause the balls to clutch a pin when inserted in said tube.

In testimony whereof we have signed our names to this specification in the presence of two subscribing witnesses.

WM. NEPEAU HUTCHISON.
JAMES ARCHIBALD ANDREW.

Witnesses:
F. G. RICHARDS,
JAMES TOWNSLEY.